US006343250B1

(12) United States Patent
Kuras et al.

(10) Patent No.: US 6,343,250 B1
(45) Date of Patent: Jan. 29, 2002

(54) METHOD AND APPARATUS FOR SMOOTHING THE OUTPUT OF A HYDROSTATIC TRANSMISSION NEAR ZERO SPEED

(75) Inventors: Brian D. Kuras, East Peoria; Charles E. Rose, Metamora, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/575,476

(22) Filed: May 19, 2000

(51) Int. Cl.[7] ................................................ F16H 39/46
(52) U.S. Cl. .............................. 701/51; 701/53; 701/54
(58) Field of Search .............................. 701/51, 53, 54, 701/57; 477/120, 155, 143; 60/421, 428, 484, 491; 180/6.48

(56) References Cited

U.S. PATENT DOCUMENTS

| | | | | |
|---|---|---|---|---|
| 3,803,841 A | * 4/1974 | Erickson et al. | 60/421 |
| 3,901,031 A | * 8/1975 | Knapp et al. | 60/395 |
| 4,365,473 A | * 12/1982 | Schexnaydet et al. | 60/447 |
| 5,575,735 A | * 11/1996 | Coutant et al. | 475/72 |
| 5,682,315 A | 10/1997 | Coutant et al. | 701/57 |
| 5,729,067 A | 3/1998 | Janutka | 310/135 |
| 5,799,487 A | 9/1998 | Valsamis | 60/487 |
| 5,848,520 A | 12/1998 | Arfstrom et al. | 56/11.4 |
| 5,848,664 A | * 12/1998 | Kaspar | 180/308 |
| 5,873,427 A | 2/1999 | Ferguson et al. | 180/178 |
| 5,875,631 A | 3/1999 | Smith | 60/444 |
| 5,876,185 A | 3/1999 | Schimpf et al. | 417/213 |
| 5,881,629 A | 3/1999 | Gollner et al. | 91/505 |
| 5,905,918 A | 5/1999 | Nakamura et al. | 396/87 |
| 5,980,215 A | 11/1999 | Robeller et al. | 417/219 |
| 5,989,001 A | 11/1999 | Eisenmann | 418/61.3 |
| 5,996,342 A | 12/1999 | Khan et al. | 60/421 |
| 5,996,343 A | 12/1999 | Kuras | 60/448 |
| 6,003,314 A | 12/1999 | Sommer | 60/438 |

* cited by examiner

*Primary Examiner*—William A. Cuchlinski, Jr.
*Assistant Examiner*—Marthe Marc-Coleman
(74) *Attorney, Agent, or Firm*—John W. Morrison; Steven M. Hanley

(57) ABSTRACT

A transmission assembly includes a variable displacement hydraulic pump, a hydraulic motor operatively connected to the pump, a speed sensor operable to sense the speed of an output shaft of the motor, a first actuator for setting displacement of the pump in a positive displacement range in response to a first actuator command and a second actuator for setting displacement of the pump in a negative displacement range in response to a second actuator command. A controller is operable to transmit first actuator commands to the first actuator and transmit second actuator commands to the second actuator in response to operator inputs. The operator inputs require that the displacement of the pump to move from the positive displacement range to the negative displacement range. The controller generates first actuator commands which cause the first actuator to set the displacement to zero. The controller generates second actuator commands in response to the speed of the output shaft reaching a predetermined motor speed limit which cause the second actuator to set the displacement of the pump in the negative displacement region.

19 Claims, 5 Drawing Sheets

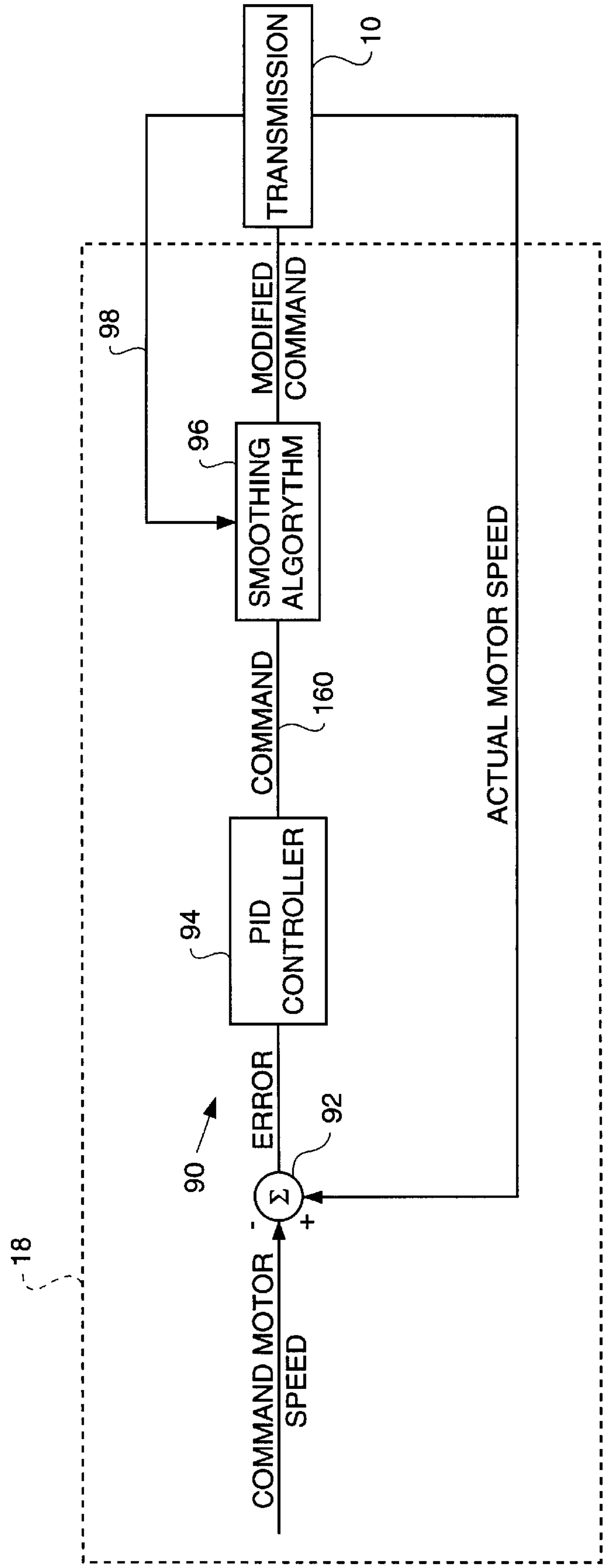
FIG - 4 -

METHOD AND APPARATUS FOR SMOOTHING THE OUTPUT OF A HYDROSTATIC TRANSMISSION NEAR ZERO SPEED

TECHNICAL FIELD OF THE INVENTION

The present invention generally relates to a continuously variable hydrostatic transmission, and more specifically to a method and apparatus for smoothing the output of a hydrostatic transmission near zero speed.

BACKGROUND OF THE INVENTION

Many work machines, particularly earth working machines, use a continuously variable transmission to drive traction wheels or tracks which propel the work machine. Typically, a hydrostatic transmission, consisting of a variable speed hydraulic pump and a hydraulic motor, provides a continuously variable speed output to the wheels or tracks of the work machine. In particular, the speed output can be continuously varied by controlling the displacement of the hydraulic pump.

Typically, the pump is set to operate in positive displacements with a first actuator actuating on a control spool, and set to operate in negative displacements with a second actuator actuating on the control spool. When it is necessary to move between positive and negative displacements, or visa versa, the pump must pass through a point of zero displacement where the control is switched from the first actuator to the second actuator. If the second actuator is engaged too little and too slowly, then the transition will be slow and perceived as not supplying a smooth continuous variation in output speed. On the other hand, if the second actuator is engaged too much and too rapidly, then there can be a discontinuity or jump in the output speed of the hydrostatic system which is also perceived as poor performance in a continuously variable transmission.

In addition, in order to operate over a wide range of operating conditions, the engine torque is split between the hydrostatic transmission and a mechanical transmission. The mechanical transmission has a number of transmission ranges corresponding to different operating speeds of the work machine. The combination of the hydrostatic transmission and the mechanical transmission allows a continuously variable transmission to operate over a wider range of speeds than is possible using the hydrostatic transmission alone.

A drawback to using a continuously variable transmission with a number of transmission ranges is that the hydraulic pump typically transitions through zero displacement in each of the operating ranges. At higher machine travel speed speeds, the poor transitions between the positive and negative displacements have a greater impact on the output speed of the transmission. Thus, any slowness or discontinuity in power transfer through the hydrostatic system has a greater impact on the durability and perceived performance of the continuously variable transmission.

What is needed therefore is a method and apparatus for smoothing the output of a hydrostatic transmission near zero speed which overcomes the above-mentioned drawbacks.

DISCLOSURE OF THE INVENTION

In accordance with a first embodiment of the present invention, there is provided a method of controlling a transmission having a variable displacement hydraulic pump, a hydraulic motor operatively connected to the pump, and a speed sensor operable to sense the speed of an output shaft of the motor, a first actuator for setting displacement of the pump in a positive displacement range in response to a first actuator command, a second actuator for setting displacement of the pump in a negative displacement range in response to a second actuator command, and a controller operable to transmit first actuator commands to the first actuator and transmit second actuator commands to the second actuator in response to operator inputs. The method includes the step of receiving operator inputs which require the displacement of the pump to move from the positive displacement range to the negative displacement range. The method further includes the step of generating first actuator commands which cause the first actuator to set the displacement to zero. The method yet further includes the step of generating second actuator commands in response to the motor speed reaching a predetermined motor speed which cause the second actuator to set the displacement of the pump in the negative displacement region.

In accordance with a second embodiment of the present invention, there is provided method of controlling a transmission. The transmission has a variable displacement hydraulic pump, a first actuator for setting displacement of the pump in a positive displacement range in response to a first actuator command, a second actuator for setting displacement of the pump in a negative displacement range in response to a second actuator command, and a controller operable to transmit first actuator commands to the first actuator and transmit second actuator commands to the second actuator in response to operator inputs The method includes the step of receiving operator inputs which require the displacement of the pump to move from the positive displacement range to the negative displacement range. The method further includes the step of generating first actuator commands which cause the first actuator to set the displacement to zero. The method yet further includes the step of generating second actuator commands in response to the displacement reaching a predetermined displacement which cause the second actuator to set the displacement of the pump in the negative displacement region.

In accordance with a third embodiment of the present invention, there is provided a transmission assembly having a variable displacement hydraulic pump, a hydraulic motor operatively connected to the pump, a speed sensor operable to sense the speed of an output shaft of the motor, a first actuator for setting displacement of the pump in a positive displacement range in response to a first actuator command, a second actuator for setting displacement of the pump in a negative displacement range in response to a second actuator command, and a controller operable to transmit first actuator commands to the first actuator and transmit second actuator commands to the second actuator in response to operator inputs. Operator inputs require that the displacement of the pump to move from the positive displacement range to the negative displacement range. The controller generates first actuator commands which cause the first actuator to set the displacement to zero. The controller generates second actuator commands in response to the motor speed reaching a predetermined motor speed which cause the second actuator to set the displacement of the pump in the negative displacement region.

BRIEF DESCRIPTION OF THE DRAWINGS

FIG. 4 is a schematic view of a closed loop control incorporating a smoothing algorithm;

BEST MODE FOR CARRYING OUT THE INVENTION

Figure 1:
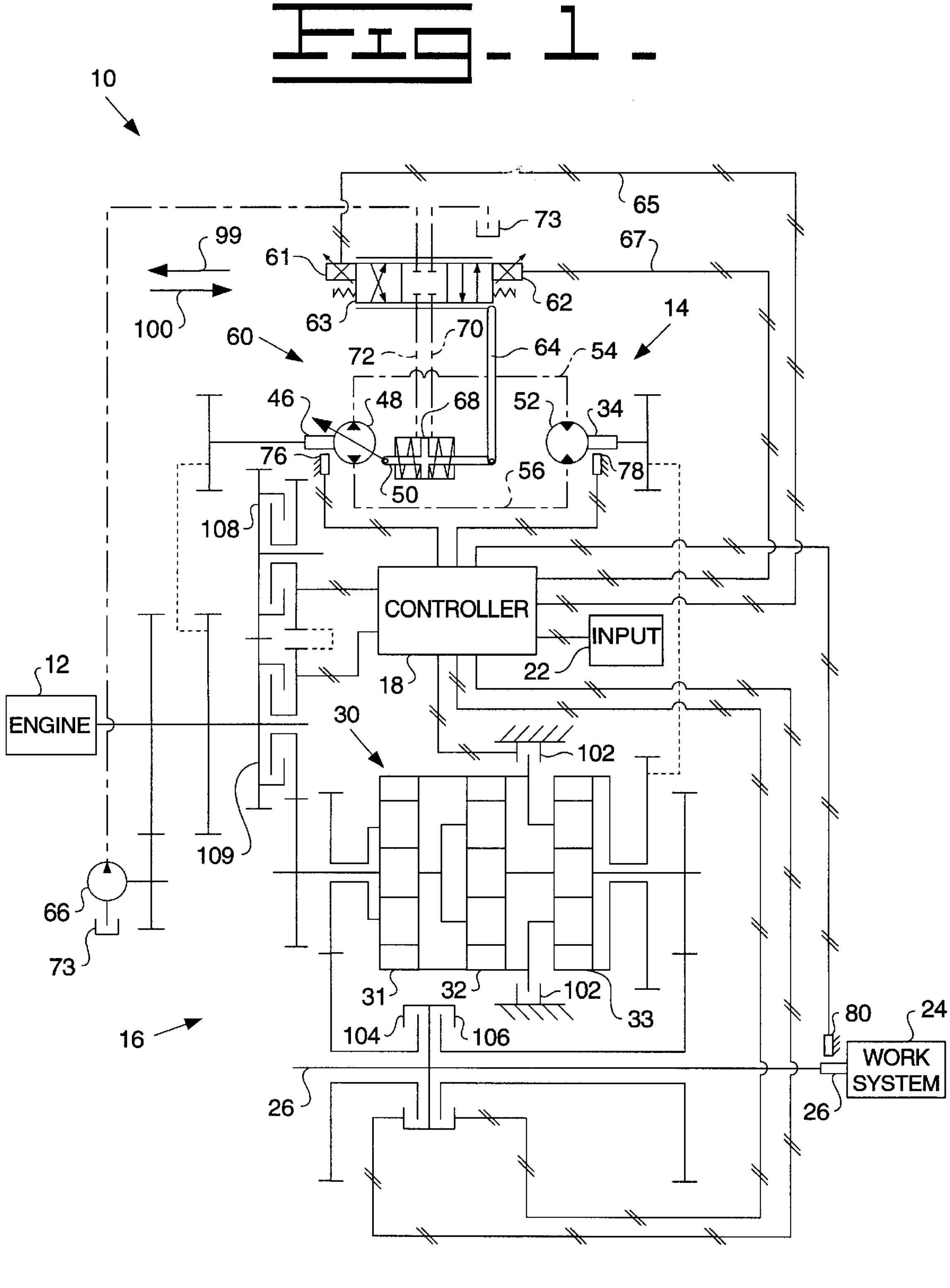
FIG. 1 is a schematic view of a hydro-mechanical, continuously variable transmission which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a transmission assembly 10 that incorporates the features of the present invention therein. The transmission assembly 10 is adapted for use in a work machine, such as a loader (not shown), having an engine 12. The transmission assembly 10 is of the continuously variable type which includes a continuously variable hydrostatic transmission 14, a mechanical transmission 16, a micro-processor based controller 18, and a command input arrangement 22. A work system 24 is connected to the transmission assembly 10 via a drive shaft 26. The work system 24 is typically the drive wheels or tracks of the work machine.

The hydrostatic transmission 14 is operatively connected to the engine 12 through a pump input drive shaft 46. The hydrostatic transmission 14 includes a variable displacement pump 48 and a motor 52 operatively connected to the variable displacement pump 48 by conduits 54 and 56 to form a hydraulic circuit. A displacement controller 50 sets the displacement of the variable displacement pump 48 and thus controls the flow of hydraulic fluid between the variable displacement pump 48 and the motor 52. Varying the flow varies the speed of the motor output shaft 34 of the motor 52.

The position of the pump displacement controller 50 is controlled by an electro-hydraulic servo mechanism 60. The servomechanism 60 includes a first solenoid or first actuator 61 and a second solenoid or second actuator 62, a three position four way valve 63, and a feedback arm 64. When a current, or a first actuator signal, is supplied to the first actuator 61 via a signal line 65, the first actuator 61 moves the three position valve in the direction of arrow 100 so as to place the valve 63 in a first position. In the first position, the valve 63 causes high pressure fluid from a separate pump 66 to be supplied to a piston member 68 via a line 70 which causes the displacement controller 50 to move in the general direction of arrow 99. Movement of the displacement controller 50 in the general direction of arrow 99 places the variable displacement pump 48 in a positive displacement. Excess fluid exits the displacement controller 50 via a line 72 and is returned to a fluid sump 73. The force of the fluid on the piston member 68 also acts on the position feedback arm 64 in the general direction of arrow 99. An equilibrium is set up between the force exerted by the first actuator 61 in the general direction of arrow 100 and the force exerted by position feedback arm 64 in the general direction of arrow 99. Thus, for positive displacements, the position of the displacement controller 50 is proportional to the current supplied to the first actuator 61 as the first actuator command.

When a current, or a second actuator signal, is supplied to the second actuator 62 via a signal line 67, the second actuator 62 moves the three position valve in the direction of arrow 99 so as to place the valve 63 in a second position. In the second position, the valve 63 causes high pressure fluid from the charge pump 66 to be supplied to a piston member 68 via the line 72 which causes the displacement controller 50 to move in the general direction of arrow 100. Movement of the displacement controller 50 in the general direction of arrow 100 places the variable displacement pump 48 in a negative displacement. Excess fluid exits the displacement controller 50 via the line 70 and is returned to a fluid sump 73. The force of the fluid on the piston member 68 also acts on the position feedback arm 64 in the general direction of arrow 100. An equilibrium is set up between the force exerted by the second actuator 62 in the general direction of arrow 99 and the force exerted by position feedback arm 64 in the general direction of arrow 100. Thus, for negative displacements, the position of the displacement controller 50 is proportional to the current supplied to the second actuator 62 as the second actuator command. It should be appreciated that the first actuator 61 can only place the variable displacement pump 48 in positive displacements and the second actuator 62 can only place the variable displacement pump 48 in negative displacements.

Figure 2:
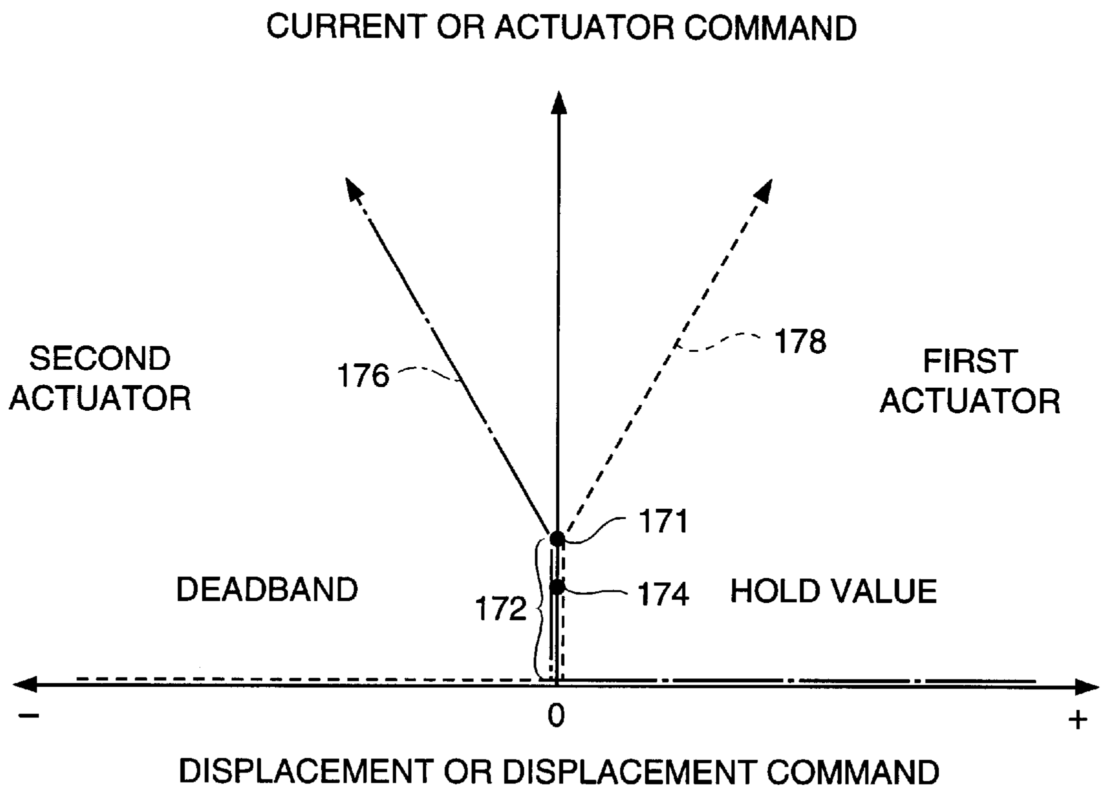
FIG. 2 is a graph showing pump displacement or pump displacement command as a function of current or actuator command.

Referring now to FIG. 2, there is shown the displacement and or displacement command of the displacement controller 50 as a function of the current supplied to the first actuator 61 as the first actuator command and the current supplied to the second actuator 62 as the second actuator command. First actuator commands below a deadband limit 171 cause the first actuator 61 to position pump 48 at zero displacement. Similarly, second actuator commands below the deadband limit 171 cause the second actuator 62 to position pump 48 at zero displacement. Therefore, any command below the deadband limit 171 defines a deadband 172 whereby current supplied to either actuator 61, 62 causes the displacement controller 50 to be positioned at zero displacement.

A hold level 174 is a nonzero current well within the deadband 172. The hold level 174 is empirically determined to smoothly command the displacement controller 50 to zero displacement. A line 176 shows the linear relationship between the second actuator commands and negative displacements whereas a line 178 shows the linear relationship between the first actuator commands and positive displacements.

Figure 3:
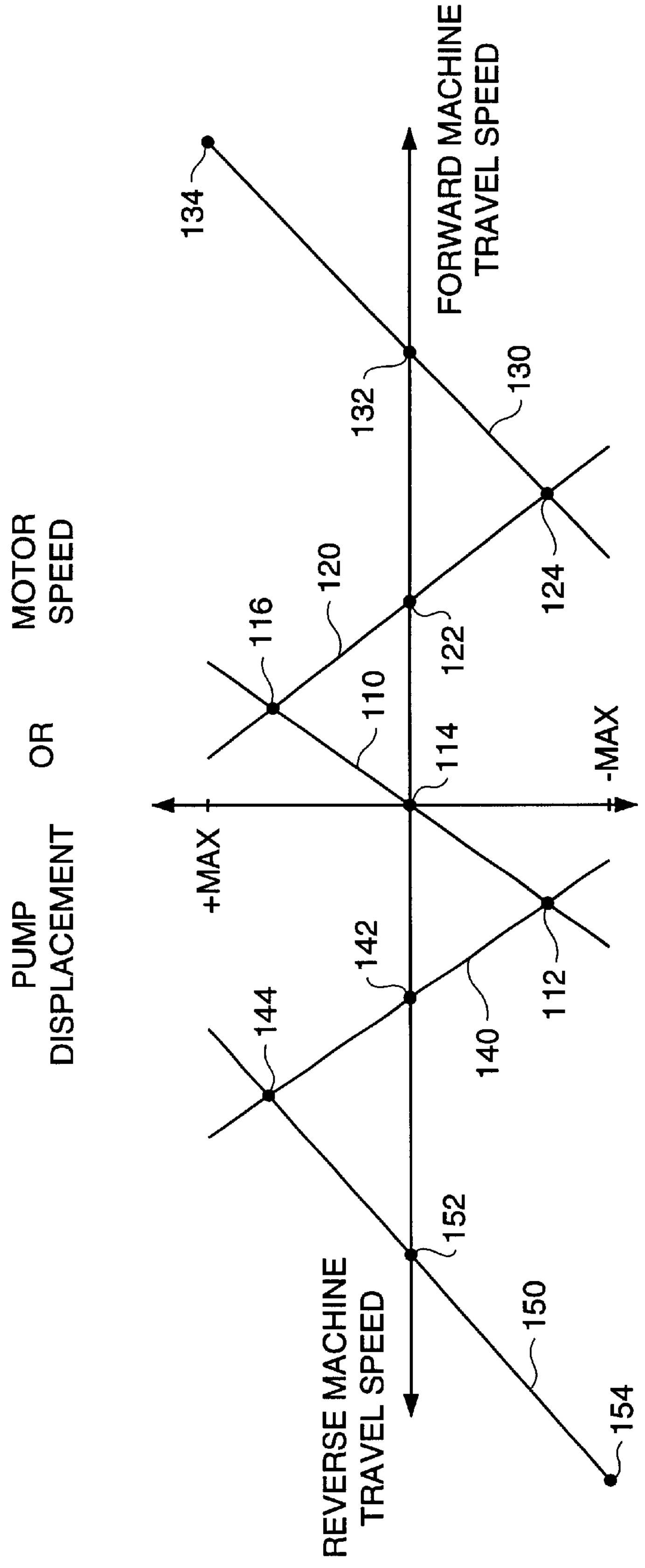
FIG. 3 is graph showing machine travel speed as a function of pump displacement or motor speed.

Referring now to FIGS. 1 and 3, the mechanical transmission 16 includes a summing planetary gear arrangement 30, having a first planetary gear set 31, a second planetary gear set 32, and a third planetary gear set 33 which selectively combines the output from the continuously variable hydrostatic transmission 14 with the output of the engine 12 to drive the output shaft 26. To select a first gear range 110, a clutch 102 and a clutch 104 are engaged. In the first gear range 110, the transmission provides a continuously variable travel speed between a point 112, where the displacement of the variable displacement pump 48 is near the maximum negative displacement, and a point 116, where the displacement of the variable displacement pump 48 is near the maximum positive displacement. Note, that zero motor speed in the first gear range 110 occurs at a point 114 which corresponds to zero machine travel speed. It should be appreciated that operation in the first gear range 110 moves the work machine in a reverse direction between the points 112 and 114 and a forward direction between the points 114 and 116.

To select a second forward gear range 120, a clutch 108 and the clutch 104 are engaged. In the second forward gear range 120, the transmission 10 provides a continuously variable travel speed between the point 116, where the displacement of the variable displacement pump 48 is near the maximum positive displacement, and a point 124, where the displacement of the variable displacement pump 48 is near the maximum negative displacement. Note, that zero motor speed in the second forward gear range 120 occurs at a point 122 at an intermediate forward machine travel speed.

To select a third forward gear range 130, the clutch 108 and a clutch 106 are engaged. In the third forward gear range 130, the transmission 10 provides a continuously variable travel speed between the point 124, where the displacement of the variable displacement pump 48 is near the maximum negative displacement, and a point 134, where the displacement of the variable displacement pump 48 is at the maximum positive displacement. Note, that zero motor speed in the third forward gear range 130 occurs at a point 132 which corresponds to a relatively high forward machine travel speed.

To select a second reverse gear range 140, a clutch 109 and the clutch 104 are engaged. In the second reverse gear range 140, the transmission 10 provides a continuously variable travel speed between the point 112, where the displacement of the variable displacement pump 48 is near the maximum negative displacement, and a point 144, where the displacement of the variable displacement pump 48 is near the maximum positive displacement. Note, that zero motor speed in the second reverse gear range 140 occurs at a point 142 at an intermediate reverse machine travel speed.

To select a third reverse gear range 150, the clutch 109 and a clutch 106 are engaged. In the third reverse gear range 150, the transmission 10 provides a continuously variable travel speed between the point 144, where the displacement of the variable displacement pump 48 is near the maximum positive displacement, and a point 154, where the displacement of the variable displacement pump 48 is at the maximum negative displacement. Note, that zero motor speed in the third reverse gear range 150 occurs at a point 152 which corresponds to a relatively high reverse machine travel speed.

The transmission 10 further includes a transmission input speed sensor 76 operative to sense the speed of the pump input shaft 46 and direct a transmission input speed signal representative of the transmission input speed or engine speed to the controller 18. The transmission 10 yet further includes a motor speed sensor 78 operative to sense the speed of the motor output shaft 34 and direct a motor speed signal representative of the motor output speed to the controller 18. The motor speed signal combined with the transmission input speed signal can also be used to determine a transmission output speed and a machine travel speed if the engagement state of the clutches 102, 104, 106, 108, and 109 are known.

The transmission 10 further includes a transmission output speed sensor 80 is operative to sense the transmission output speed and direct a transmission output speed signal to the controller 18. Either of the motor speed sensor 78 combined with the input speed sensor 76 or the transmission output speed sensor 80 can be used to calculate the transmission output speed or the machine travel speed. However, in the present invention, the motor speed sensor 78 is used to precisely control the displacement of the pump 48 and therefore has a much higher resolution and lower dropout than the transmission output speed sensor 80. Thus, it is preferable to use the motor speed sensor 78 and the engagement state of the clutches 102, 104, 106, 108, and 109 to determine the transmission output speed and the machine travel speed. However, it is still possible and practical to use the output speed sensor 80 to determine machine travel speed.

The command input arrangement 22 receives operator inputs and transmits desired velocity and directional signals to the controller 18. The controller 18 includes RAM and ROM (not shown) that store transmission control software. The controller 18 reads the desired velocity, directional signals, and speed signals, and transmits clutch control signals to control the engagement of the clutches 102, 104, 106, 108, 109 to engage the appropriate gear ratio as described above. In addition, the controller 18 generates the first actuator command signal and the second actuator command signals which control the displacement of the pump 48, and thus, the speed of the output shaft 34 of the motor 52.

Referring now to FIG. 4, there is shown the a schematic view of a closed loop control system 90 within the controller 18. The closed loop control system 90 processes the commanded motor speed calculated by the controller 18 and actual motor speed provided by the transmission speed sensor 78 and generates first actuator commands and second actuator commands in response thereto. In particular, the commanded motor speed is passed into a closed loop control system 90 as a command while the actual motor speed is used is passed into the closed loop control system 90 as a feedback value. In a comparator 92, the actual velocity is subtracted from the commanded velocity to produce an error signal which is fed into a simple proportional, integral, and derivative controller, or PID controller 94. The PID controller 94 produces a command signal (displacement command) based on calculations of the error signal which is directed to the transmission 10 as the first actuator command or the second actuator command so as to responsively control the displacement of the variable displacement pump 48 as previously discussed in FIG. 2. The controller 94 may also be one of a proportional integral controller, open loop displacement controller, or any combination of P,I,D controller.

When the controller 18 receives operator inputs from the command input arrangement 22 which requires the displacement of the pump 48 to move from the positive displacement range to the negative displacement range, then a smoothing algorithm 96 is applied to both the first actuator commands and second actuator commands which smooth the output of the transmission 10 as the displacement of the variable displacement pump 48 passes through zero displacement. It should be appreciated that the displacement of pump 48 is zero at the points 152, 142, 114, 132 and 132 of FIG. 3. Operating parameters of the transmission 10, particularly displacement of the pump 48 or speed of the motor 52, is fed back to the smoothing algorithm 96 via the line 98 to adjust the smoothing algorithm 96.

Figure 5A:
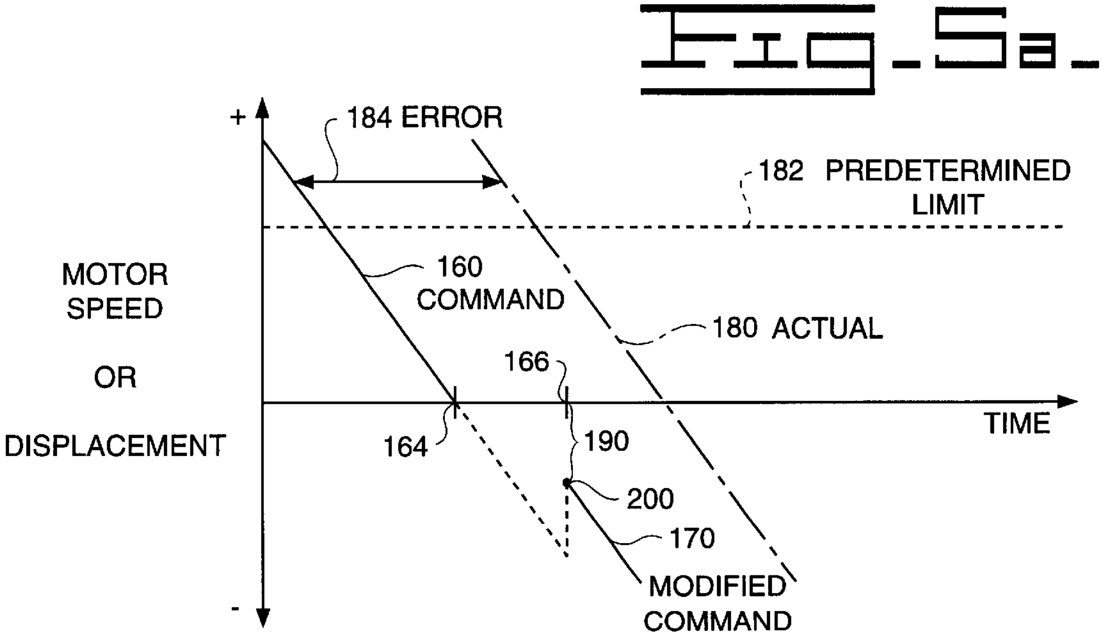
FIG. 5A is plot of commanded and modified commanded displacement versus actual motor speed or actual displacement.
Figure 5B:
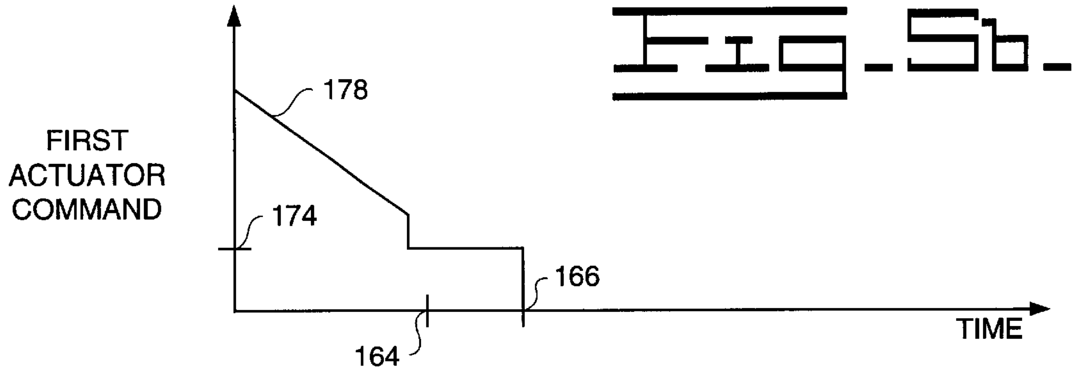
FIG. 5B is a plot of the first actuator command before, during, and after the smoothing algorithm.
Figure 5C:
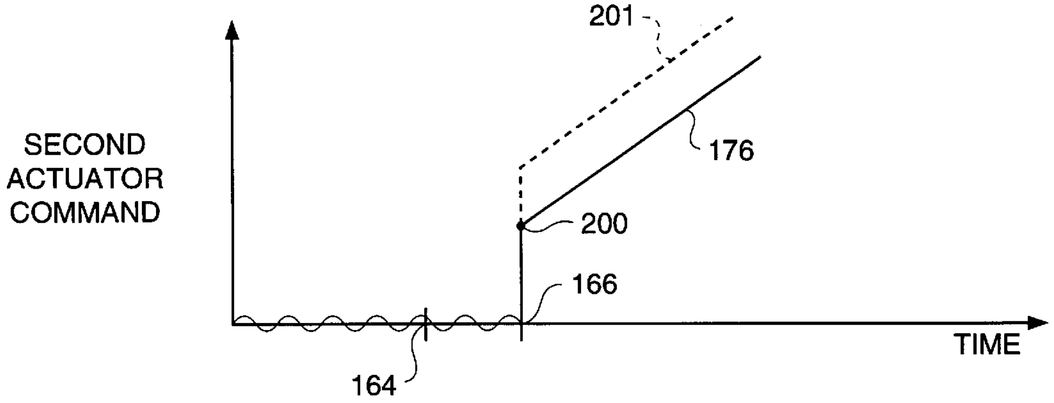
FIG. 5C is a plot of the second actuator command before, during, and after the smoothing algorithm.

Referring now to FIGS. 5A, 5B, and 5C, there is shown a detailed graph of the operation of the smoothing algorithm 96. The command signal 160 commands the displacement to transition from a positive displacement, controlled by the first actuator 61 of FIG. 1, to a negative displacement, controlled by the second actuator 62 of FIG. 1. It should be appreciated that the smoothing algorithm 96 is also applicable for transitions from a negative displacement to a positive displacement. Thus, the smoothing algorithm 96 is employed when the displacement command of the transmission 10 transitions through any of the points 152, 142, 114, 122, or 132 of FIG. 3.

It should be appreciated by one skilled in the art that the displacement of the variable displacement pump 48 is related to the speed of the output shaft 34 of the motor 52. In particular, the displacement command 160 can also be considered a motor speed command for open loop systems such as a feed forward controller.

If the first actuator command and second actuator command are not modified by the smoothing algorithm, then the second actuator 62 would start to engage at a time 164 where the actual displacement 180 is much greater than zero. Engaging the second actuator 62 at the time 164 would cause a discontinuity in the output speed of the motor 52 and would produce high torque levels which would be perceived as a jerk in the operation of the transmission 10.

To eliminate this discontinuity in the output speed of the transmission 10, the smoothing algorithm 96 is applied at the time 164 where the displacement command (or motor command in a feed forward controller) 160 transitions from the positive displacement region to the negative displacement region. First, the smoothing algorithm 96 causes the controller 18 to generate the first actuator command which cause the first actuator 61 to set the displacement of the displacement controller 50 to zero. In particular, the controller 18 generates first actuator commands at the hold level 174, well within the deadband 172 of the valve 63, (shown in FIG. 5B) which cause the first actuator 61 to smoothly transition the displacement controller 50 to zero displacement.

Second, the smoothing algorithm 96 holds the first actuator command at the hold level 174. At a time 166, the actual displacement (or motor speed) 160 has reached a predetermined limit 182 whereby transitioning the control of the variable displacement pump 48 from the first actuator 61 to the second actuator 62 will produce a smooth variable speed from the motor 52 or a smooth variable displacement from the displacement controller 50.

In particular, the predetermined limit 182 is a function of an error 184 between the displacement (or motor speed) command 160 and the actual displacement (or actual motor speed) 180. Therefore, as the error 184 increases, the predetermined limit 182 must be increased to produce a smooth variable output from the speed from the motor 52 or smooth variable displacement from the displacement controller 50. Alternately, as the error decreases, the predetermined limit 182 must be decreased to produce a smooth variable output from the motor 52 or a smooth variable displacement from the displacement controller 50.

Third, once the actual displacement (or actual motor speed) 180 reaches the predetermined limit 182 at the time 166, the controller 18 sets the first actuator command to zero (as shown in FIG. 5B) and generates a modified displacement (or motor speed) command 170 (shown in FIG. 5A) which is used to generate the second actuator commands (shown in FIG. 5C). The modified displacement command (or modified speed command) 170 has the same rate of change as the displacement (or speed) command 160 but is offset from zero by an offset value 190.

The controller 18 also resets the integral term of the PID controller 94 to a reset value which is a function of motor acceleration (or rate of change of displacement). The offset value 190 is a function of the proportional term of the PID controller 94 and the reset term. Since the reset term is a function of motor acceleration (or rate of change of displacement), the offset value 190 is adaptively adjusted as a function of motor acceleration (or rate of change of displacement). In particular, as the motor acceleration (or rate of change of displacement) decreases, the offset value 190 decreases whereas as motor acceleration (or rate of change of displacement) increases, the offset value 190 increases. The offset value 190 is used to define an initial point 200 of the modified displacement command (or modified motor speed command) 170. If the initial point 200 had not been offset from zero by the offset value 190, then the second actuator command would follow the dashed line 201 which would produce high torque and jerk. After the initial point 200, the second actuator command follows the linear relationship of the line 176 as shown in FIG. 5C. Alternately, when using an open loop controller to control displacement or speed, the offset value 190 is a function of the modified feed forward term.

INDUSTRIAL APPLICABILITY

In operation, a smoothing algorithm 96 is used in conjunction with a continuously variable transmission 10 when a controller 18 determines that a hydrostatic pump 48 must transition through a zero displacement point where the speed of the output shaft 34 is at or near zero. These zero displacement points occur at the ground speeds 152, 142, 114, 122 and 132 shown in FIG. 3.

A closed loop control system 90 compares desired commands, either displacement or motor speed, to the actual displacement or motor speed to generate a command 160. When the command reaches zero at the time 164, the smoothing algorithm 96 causes the controller 18 to generate first actuator command which causes the first actuator 61 to set the displacement of the displacement controller 50 to the hold level 174 (shown in FIG. 5B) which causes the first actuator 61 to smoothly transition the displacement controller 50 to zero displacement.

The smoothing algorithm 96 holds the first actuator command at the hold level 174 until the time 166. At the time 166, the actual displacement (or motor speed) 180 has reached the predetermined limit 182 whereby transitioning the control of the variable displacement pump 48 from the first actuator 61 to the second actuator 62 producing a smooth variable speed from the motor 52 or a smooth variable displacement from the displacement controller 50.

Once the actual displacement (or speed) 180 reaches the predetermined limit 182 at the time 166, the controller 18 sets the first actuator command to zero, resets the integral term of the PID controller 94 to zero or a reset, and generates a modified displacement (or motor speed) command 170 which is used to generate the second actuator commands. The modified displacement (or motor speed) command 170 has the same rate of change as the displacement (or motor speed) command 160 but is offset from zero by the offset value 190.

The offset value 190 is used to define an initial point 200 of the modified displacement (or speed) command 170. If the initial point 200 had not been offset from zero by the offset value 190, then the second actuator command would follow the dashed line 201 which would produce high torque and jerk. After the initial point 200, the second actuator command follows the linear relationship of the line 176 as shown in FIG. 5C.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of controlling a transmission having (i) a variable displacement hydraulic pump, (ii) a hydraulic motor operatively connected to the pump, (iii) a speed sensor operable to sense a speed of an output shaft of the hydraulic motor, (iv) a first actuator for setting displacement of the pump in a positive displacement range in response to a first actuator command, (v) a second actuator for setting displacement of the pump in a negative displacement range in response to a second actuator command, and (vi) a controller operable to transmit first actuator commands to the first actuator and transmit second actuator commands to the second actuator in response to operator inputs, comprising the steps of:

receiving operator inputs which require the displacement of the pump to move from the positive displacement range to the negative displacement range;

generating first actuator commands which cause the first actuator to set the displacement to zero; and generating second actuator commands in response to the motor speed reaching a predetermined motor speed limit which cause the second actuator to set the displacement of the pump in the negative displacement region, the second actuator commands coinciding with a transitioning drive condition of the transmission between first and second transmission operating ranges.

2. The method of claim 1, further comprising the steps of:

determining the first actuator commands and the second actuator commands from a commanded motor speed; and calculating an error between the actual motor speed and commanded motor speed;

increasing the predetermined motor speed limit as the error increases; and decreasing the predetermined motor speed limit as the error decreases.

3. The method of claim 1, further comprising the step of determining an initial value for the second actuator command based on the rate of change of the speed of the output shaft.

4. A method of controlling a transmission having (i) a variable displacement hydraulic pump, (ii) a hydraulic motor operatively connected to the pump, (iii) a speed sensor operable to sense a speed of an output shaft of the hydraulic motor, (iv) a first actuator for setting displacement of the pump in a positive displacement range in response to a first actuator command, (v) a second actuator for setting displacement of the pump in a negative displacement range in response to a second actuator command, and (vi) a controller operable to transmit first actuator commands to the first actuator and transmit second actuator commands to the second actuator in response to operator inputs, comprising the steps of:

receiving operator inputs which require the displacement of the pump to move from the positive displacement range to the negative displacement range;

generating first actuator commands which cause the first actuator to set the displacement to zero;

determining a deadband limit, below which the first actuator command positions the pump at zero displacement;

setting the first actuator command to a hold level between zero and the deadband limit; and generating second actuator commands in response to the motor speed reaching a predetermined motor speed limit which cause the second actuator to set the displacement of the pump in the negative displacement region.

5. A method of controlling a transmission having (i) a variable displacement hydraulic pump, (ii) a hydraulic motor operatively connected to the pump, (iii) a speed sensor operable to sense a speed of an output shaft of the hydraulic motor, (iv) a first actuator for setting displacement of the pump in a positive displacement range in response to a first actuator command, (v) a second actuator for setting displacement of the pump in a negative displacement range in response to a second actuator command, and (vi) a controller operable to transmit first actuator commands to the first actuator and transmit second actuator commands to the second actuator in response to operator inputs, wherein the controller is a PID closed loop controller which feeds back the speed of the output shaft, comprising the steps of:

receiving operator inputs which require the displacement of the pump to move from the positive displacement range to the negative displacement range;

generating first actuator commands which cause the first actuator to set the displacement to zero;

generating second actuator commands in response to the motor speed reaching a predetermined motor speed limit which cause the second actuator to set the displacement of the pump in the negative displacement region;

determining an initial value for the second actuator command based on the rate of change of the speed of the output shaft; and resetting an integral term of PID controller to a reset value prior to the second actuator command generating step.

6. A method of controlling a transmission having (i) a variable displacement hydraulic pump, (ii) a hydraulic motor operatively connected to the pump, (iii) a speed sensor operable to sense a speed of an output shaft of the hydraulic motor, (iv) a first actuator for setting displacement of the pump in a positive displacement range in response to a first actuator command, (v) a second actuator for setting displacement of the pump in a negative displacement range in response to a second actuator command, and (vi) a controller operable to transmit first actuator commands to the first actuator and transmit second actuator commands to the second actuator in response to operator inputs, wherein the controller is a open loop controller using a feed forward term, comprising the steps of:

receiving operator inputs which require the displacement of the pump to move from the positive displacement range to the negative displacement range;

generating first actuator commands which cause the first actuator to set the displacement to zero;

generating second actuator commands in response to the motor speed reaching a predetermined motor speed limit which cause the second actuator to set the displacement of the pump in the negative displacement region; and determining an initial value for the second actuator command based on the rate of change of the speed of the output shaft and basing the initial value on the feed forward term.

7. A method of controlling a transmission having (i) a variable displacement hydraulic pump, (ii) a first actuator for setting displacement of the pump in a positive displacement range in response to a first actuator command, (iii) a second actuator for setting displacement of the pump in a negative displacement range in response to a second actuator command, and (iv) a controller operable to transmit first actuator commands to the first actuator and transmit second actuator commands to the second actuator in response to operator inputs, comprising the steps of:

receiving operator inputs which require the displacement of the pump to move from the positive displacement range to the negative displacement range;

generating first actuator commands which cause the first actuator to set the displacement to zero; and generating second actuator commands in response to the displacement reaching a predetermined displacement limit which cause the second actuator to set the displacement of the pump in the negative displacement region, the second actuator commands coinciding with a transitioning drive condition of the transmission between first and second transmission operating ranges.

8. The method of claim 7, further comprising the steps of:

determining the first actuator commands and the second actuator commands from a commanded displacement; and calculating an error between the actual displacement and the commanded displacement;

increasing the predetermined displacement limit as the error increases; and decreasing the predetermined displacement limit as the error decreases.

9. The method of claim 7, further comprising the step of determining an initial value for the second actuator command based on the rate of change of the displacement of the pump.

10. A method of controlling a transmission having (i) a variable displacement hydraulic pump, (ii) a first actuator for setting displacement of the pump in a positive displacement range in response to a first actuator command, (iii) a second actuator for setting displacement of the pump in a negative displacement range in response to a second actuator command, and (iv) a controller operable to transmit first actuator commands to the first actuator and transmit second actuator commands to the second actuator in response to operator inputs, comprising the steps of:

receiving operator inputs which require the displacement of the pump to move from the positive displacement range to the negative displacement range;

generating first actuator commands which cause the first actuator to set the displacement to zero;

determining a deadband limit, below which the first actuator command positions the pump at zero displacement;

setting the first actuator command to a hold level between zero and the deadband limit; and generating second actuator commands in response to the displacement reaching a predetermined displacement limit which cause the second actuator to set the displacement of the pump in the negative displacement region.

11. A method of controlling a transmission having (i) a variable displacement hydraulic pump, (ii) a first actuator for setting displacement of the pump in a positive displacement range in response to a first actuator command, (iii) a second actuator for setting displacement of the pump in a negative displacement range in response to a second actuator command, and (iv) a controller operable to transmit first actuator commands to the first actuator and transmit second actuator commands to the second actuator in response to operator inputs, wherein the controller is a PID closed loop controller which feeds back the displacement of the pump, comprising the steps of:

receiving operator inputs which require the displacement of the pump to move from the positive displacement range to the negative displacement range;

generating first actuator commands which cause the first actuator to set the displacement to zero;

generating second actuator commands in response to the displacement reaching a predetermined displacement limit which cause the second actuator to set the displacement of the pump in the negative displacement region;

resetting an integral term of PID controller to a reset value prior to the second actuator command generating step; and determining an initial value for the second actuator command based on the rate of change of the displacement of the pump.

12. The method of claim 11, wherein the controller is a open loop controller using a feed forward term, the determining step further comprising the step of basing the initial value on the feed forward term.

13. A transmission assembly comprising:

a variable displacement hydraulic pump;

a hydraulic motor operatively connected to the pump;

a speed sensor operable to sense the speed of an output shaft of the motor;

a first actuator for setting displacement of the pump in a positive displacement range in response to a first actuator command;

a second actuator for setting displacement of the pump in a negative displacement range in response to a second actuator command; and a controller operable to transmit first actuator commands to the first actuator and transmit second actuator commands to the second actuator in response to operator inputs, wherein:

operator inputs require that the displacement of the pump to move from the positive displacement range to the negative displacement range, the controller generates first actuator commands which cause the first actuator to set the displacement to zero, and the controller generates second actuator commands in response to the speed of the output shaft reaching a predetermined motor speed limit which cause the second actuator to set the displacement of the pump in the negative displacement region, the second actuator commands coinciding with a transitioning drive condition of the transmission between first and second transmission operating ranges.

14. The transmission assembly of claim 13, wherein:

the first actuator command and the second actuator command are determined from a command motor speed, an error is calculated as the difference between the actual motor speed and the command motor speed, the predetermined motor speed limit increases as error increases; and the predetermined motor speed limit decreases as error decreases.

15. The transmission assembly of claim 13, wherein:

the first actuator is an electric solenoid, and the second actuator is an electric solenoid.

16. A transmission assembly comprising:

a variable displacement hydraulic pump;

a hydraulic motor operatively connected to the pump;

a speed sensor operable to sense the speed of an output shaft of the motor;

a first actuator for setting displacement of the pump in a positive displacement range in response to a first actuator command;

a second actuator for setting displacement of the pump in a negative displacement range in response to a second actuator command; and a controller operable to transmit first actuator commands to the first actuator and transmit second actuator commands to the second actuator in response to operator inputs, wherein:

operator inputs require that the displacement of the pump to move from the positive displacement range to the negative displacement range, the controller generates first actuator commands which cause the first actuator to set the displacement to zero, the controller generates second actuator commands in response to the speed of the output shaft reaching a predetermined motor speed limit which cause the second actuator to set the displacement of the pump in the negative displacement region, the controller determines a deadband limit, below which the first actuator command positions the pump at zero displacement, and the controller sets the first actuator command to a hold level between zero and the deadband limit.

17. A transmission assembly comprising:

a variable displacement hydraulic pump;

a hydraulic motor operatively connected to the pump;

a speed sensor operable to sense the speed of an output shaft of the motor;

a first actuator for setting displacement of the pump in a positive displacement range in response to a first actuator command;

a second actuator for setting displacement of the pump in a negative displacement range in response to a second actuator command; and a controller operable to transmit first actuator commands to the first actuator and transmit second actuator commands to the second actuator in response to operator inputs, wherein:

operator inputs require that the displacement of the pump to move from the positive displacement range to the negative displacement range, the controller generates first actuator commands which cause the first actuator to set the displacement to zero, the controller generates second actuator commands in response to the speed of the output shaft reaching a predetermined motor speed limit which cause the second actuator to set the displacement of the pump in the negative displacement region, the controller is a closed loop PID controller which feeds back the speed of the output shaft, and an integral term of the closed loop controller is reset prior to the generating the second actuator commands.

18. The transmission assembly of claim 17, wherein the controller sets an initial value for the second actuator command based on the rate of change of the speed of the output shaft.

19. The transmission assembly of claim 18, wherein:

the controller increases the initial value as the rate of change of the speed of the output shaft increases, and the controller decreases the initial value as the rate of change of the speed of the output shaft decreases.

* * * * *